(12) United States Patent
Belknap et al.

(10) Patent No.: US 9,720,941 B2
(45) Date of Patent: *Aug. 1, 2017

(54) FULLY AUTOMATED SQL TUNING

(71) Applicant: Oracle International Corporation, Redwood Shores, CA (US)

(72) Inventors: Peter Belknap, Redwood City, CA (US); Benoit Dageville, Foster City, CA (US); Karl Dias, Foster City, CA (US); Khaled Yagoub, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/549,449

(22) Filed: Nov. 20, 2014

(65) Prior Publication Data

US 2015/0081669 A1 Mar. 19, 2015

Related U.S. Application Data

(63) Continuation of application No. 12/188,975, filed on Aug. 8, 2008, now Pat. No. 8,903,801.

(60) Provisional application No. 60/972,681, filed on Sep. 14, 2007.

(51) Int. Cl.
*G06F 17/30* (2006.01)

(52) U.S. Cl.
CPC .. *G06F 17/30306* (2013.01); *G06F 17/30442* (2013.01); *G06F 17/30463* (2013.01); *Y10S 707/99932* (2013.01)

(58) Field of Classification Search
CPC ......... G06F 17/30306; G06F 17/30463; G06F 17/30442; Y10S 707/99932

USPC ......................................................... 707/718
See application file for complete search history.

(56) References Cited

U.S. PATENT DOCUMENTS

| | | | |
|---|---|---|---|
| 4,769,772 | A | 9/1988 | Dwyer |
| 4,803,614 | A | 2/1989 | Banba et al. |
| 4,829,427 | A | 5/1989 | Green |
| 4,956,774 | A | 9/1990 | Shibamiya et al. |
| 5,091,852 | A | 2/1992 | Tsuchida et al. |
| 5,251,131 | A | 10/1993 | Masand et al. |

(Continued)

OTHER PUBLICATIONS

Zhu et al., "A Piggyback Method to Collect Statistics for Query Optimization in Database Management Systems", In the Proceedings of the 1998 Conference of the Centre for Advanced Studies on Collaborative Research, Toronto, 1998, 16 pages.*

(Continued)

*Primary Examiner* — Phuong Thao Cao
(74) *Attorney, Agent, or Firm* — Hickman Palermo Becker Bingham LLP

(57) ABSTRACT

Techniques are provided for a fully-automated process for tuning database query language statements that selects database query language statements for tuning, tunes the database query language statements and generates tuning recommendations, tests the tuning recommendations, and determines whether to implement the tuning recommendations based on the test results. The fully-automated tuning process may also automatically implement certain tuning recommendations and monitor the performance of the database query language statements for which tuning recommendations have been implemented.

25 Claims, 2 Drawing Sheets

(56) References Cited

U.S. PATENT DOCUMENTS

| | | | |
|---|---|---|---|
| 5,287,459 A | 2/1994 | Gniewek | |
| 5,301,317 A | 4/1994 | Lohman et al. | |
| 5,315,580 A | 5/1994 | Phaal | |
| 5,325,525 A | 6/1994 | Shan et al. | |
| 5,339,429 A | 8/1994 | Tanaka et al. | |
| 5,379,424 A | 1/1995 | Morimoto et al. | |
| 5,412,804 A | 5/1995 | Krishna | |
| 5,412,806 A | 5/1995 | Du et al. | |
| 5,444,820 A | 8/1995 | Tzes et al. | |
| 5,452,468 A | 9/1995 | Peterson | |
| 5,459,837 A | 10/1995 | Caccavale | |
| 5,469,560 A | 11/1995 | Beglin | |
| 5,495,419 A | 2/1996 | Rostoker et al. | |
| 5,495,606 A | 2/1996 | Borden et al. | |
| 5,504,894 A | 4/1996 | Ferguson et al. | |
| 5,537,588 A | 7/1996 | Engelmann et al. | |
| 5,551,027 A | 8/1996 | Choy et al. | |
| 5,572,640 A | 11/1996 | Schettler | |
| 5,574,900 A | 11/1996 | Huang et al. | |
| 5,590,319 A | 12/1996 | Cohen et al. | |
| 5,642,515 A | 6/1997 | Jones et al. | |
| 5,671,403 A | 9/1997 | Shekita et al. | |
| 5,675,791 A | 10/1997 | Bhide et al. | |
| 5,680,547 A | 10/1997 | Chang | |
| 5,694,591 A | 12/1997 | Du et al. | |
| 5,710,915 A | 1/1998 | McElhiney | |
| 5,761,654 A | 6/1998 | Tow | |
| 5,764,912 A | 6/1998 | Rosborough | |
| 5,765,150 A | 6/1998 | Burrows | |
| 5,787,251 A | 7/1998 | Hamilton et al. | |
| 5,794,227 A | 8/1998 | Brown | |
| 5,797,136 A | 8/1998 | Boyer et al. | |
| 5,822,748 A | 10/1998 | Cohen et al. | |
| 5,852,820 A | 12/1998 | Burrows | |
| 5,857,180 A | 1/1999 | Hallmark et al. | |
| 5,860,069 A | 1/1999 | Wright | |
| 5,875,445 A | 2/1999 | Antonshenkov | |
| 5,918,225 A | 6/1999 | White et al. | |
| 6,002,669 A | 12/1999 | White | |
| 6,003,022 A | 12/1999 | Eberhard et al. | |
| 6,009,265 A | 12/1999 | Huang et al. | |
| 6,026,390 A | 2/2000 | Ross et al. | |
| 6,026,391 A | 2/2000 | Osborn et al. | |
| 6,026,394 A | 2/2000 | Tsuchida et al. | |
| 6,061,676 A | 5/2000 | Srivastava et al. | |
| 6,182,079 B1* | 1/2001 | Lenzie | G06F 17/30336 |
| 6,205,451 B1 | 3/2001 | Norcott et al. | |
| 6,289,335 B1 | 9/2001 | Downing et al. | |
| 6,298,342 B1 | 10/2001 | Graefe et al. | |
| 6,334,128 B1 | 12/2001 | Norcott et al. | |
| 6,339,768 B1 | 1/2002 | Leung et al. | |
| 6,353,826 B1 | 3/2002 | Seputis | |
| 6,356,889 B1 | 3/2002 | Lohman et al. | |
| 6,356,891 B1 | 3/2002 | Agrawal et al. | |
| 6,370,524 B1 | 4/2002 | Witkowski | |
| 6,374,257 B1* | 4/2002 | Guay | G06F 9/4435 |
| | | | 707/741 |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,526,526 B1 | 2/2003 | Dong et al. | |
| 6,529,896 B1 | 3/2003 | Leung et al. | |
| 6,529,901 B1 | 3/2003 | Chaudhuri et al. | |
| 6,594,820 B1* | 7/2003 | Ungar | G06F 11/3688 |
| | | | 714/38.13 |
| 6,598,038 B1 | 7/2003 | Guay et al. | |
| 6,615,222 B2 | 9/2003 | Hornibrook et al. | |
| 6,684,203 B1 | 1/2004 | Waddington et al. | |
| 6,694,306 B1 | 2/2004 | Nishizawa et al. | |
| 6,721,724 B1* | 4/2004 | Galindo-Legaria | G06F 17/30436 |
| 6,738,756 B1* | 5/2004 | Brown | G06F 17/30445 |
| 6,807,546 B2 | 10/2004 | Young-Lai | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,990,503 B1 | 1/2006 | Luo et al. | |
| 7,007,007 B2 | 2/2006 | Slutz | |
| 7,089,225 B2 | 8/2006 | Li et al. | |
| 7,139,749 B2 | 11/2006 | Bossman et al. | |
| 7,155,428 B1 | 12/2006 | Brown et al. | |
| 7,155,459 B2 | 12/2006 | Chaudhuri et al. | |
| 7,185,000 B1 | 2/2007 | Brown et al. | |
| 7,194,452 B2 | 3/2007 | Galindo-Legaria et al. | |
| 7,246,108 B2 | 7/2007 | Ahmed | |
| 7,272,589 B1* | 9/2007 | Guay | G06F 17/30312 |
| | | | 707/716 |
| 7,305,410 B2 | 12/2007 | Skopec et al. | |
| 7,337,169 B2 | 2/2008 | Galindo-Legaria et al. | |
| 7,383,247 B2 | 6/2008 | Li et al. | |
| 7,406,477 B2 | 7/2008 | Farrar et al. | |
| 7,499,907 B2 | 3/2009 | Brown et al. | |
| 7,526,508 B2 | 4/2009 | Tan et al. | |
| 7,634,456 B2* | 12/2009 | Yagoub | G06F 17/30306 |
| 7,647,293 B2 | 1/2010 | Brown et al. | |
| 7,664,730 B2 | 2/2010 | Ziauddin et al. | |
| 7,739,263 B2* | 6/2010 | Das | G06F 17/30306 |
| | | | 707/713 |
| 7,739,269 B2* | 6/2010 | Chaudhuri | G06F 17/30463 |
| | | | 707/713 |
| 7,747,606 B2 | 6/2010 | Dageville et al. | |
| 7,805,411 B2* | 9/2010 | Ziauddin | G06F 17/30306 |
| | | | 707/688 |
| 7,890,491 B1 | 2/2011 | Simmen | |
| 7,966,313 B2 | 6/2011 | Bruno et al. | |
| 7,970,755 B2 | 6/2011 | Belknap et al. | |
| 8,019,750 B2 | 9/2011 | Kosciusko et al. | |
| 8,180,762 B2 | 5/2012 | Steinbach et al. | |
| 8,386,450 B2 | 2/2013 | Simmen | |
| 8,903,801 B2* | 12/2014 | Belknap | G06F 17/30306 |
| | | | 707/713 |
| 2001/0047372 A1 | 11/2001 | Gorelik et al. | |
| 2002/0038313 A1 | 3/2002 | Klein et al. | |
| 2002/0099521 A1 | 7/2002 | Yang et al. | |
| 2002/0138376 A1 | 9/2002 | Hinkle | |
| 2002/0188600 A1 | 12/2002 | Lindsay et al. | |
| 2003/0033291 A1 | 2/2003 | Harris | |
| 2003/0065644 A1 | 4/2003 | Horman et al. | |
| 2003/0088541 A1 | 5/2003 | Zilio et al. | |
| 2003/0093408 A1* | 5/2003 | Brown | G06F 17/30336 |
| 2003/0115212 A1 | 6/2003 | Hornibrook et al. | |
| 2003/0120682 A1* | 6/2003 | Bestgen | G06F 17/30436 |
| 2003/0135480 A1 | 7/2003 | Van Arsdale et al. | |
| 2003/0159136 A1 | 8/2003 | Huang et al. | |
| 2003/0182276 A1 | 9/2003 | Bossman et al. | |
| 2003/0212647 A1 | 11/2003 | Bangel et al. | |
| 2003/0212668 A1 | 11/2003 | Hinshaw et al. | |
| 2003/0229639 A1 | 12/2003 | Carlson et al. | |
| 2004/0003004 A1 | 1/2004 | Chaudhuri et al. | |
| 2004/0015600 A1 | 1/2004 | Tiwary et al. | |
| 2004/0181521 A1 | 9/2004 | Simmen | |
| 2004/0205062 A1 | 10/2004 | Brown et al. | |
| 2004/0220911 A1 | 11/2004 | Zuzarte et al. | |
| 2004/0244031 A1 | 12/2004 | Martinez | |
| 2005/0028134 A1 | 2/2005 | Zane et al. | |
| 2005/0055382 A1 | 3/2005 | Ferrat et al. | |
| 2005/0086195 A1* | 4/2005 | Tan | G06F 17/30289 |
| 2005/0119999 A1* | 6/2005 | Zait | G06F 17/30306 |
| 2005/0120000 A1* | 6/2005 | Ziauddin | G06F 17/30306 |
| 2005/0125393 A1 | 6/2005 | Yagoub et al. | |
| 2005/0125398 A1* | 6/2005 | Das | G06F 17/30306 |
| 2005/0125427 A1* | 6/2005 | Dageville | G06F 17/30306 |
| 2005/0125452 A1 | 6/2005 | Ziauddin et al. | |
| 2005/0131881 A1* | 6/2005 | Ghosh | G06F 17/30445 |
| 2005/0138015 A1 | 6/2005 | Dageville et al. | |
| 2005/0165741 A1 | 7/2005 | Gordon | |
| 2005/0177557 A1 | 8/2005 | Ziauddin et al. | |
| 2005/0177971 A1 | 8/2005 | Porco | |
| 2005/0187917 A1 | 8/2005 | Lawande et al. | |
| 2005/0187971 A1 | 8/2005 | Hassan et al. | |
| 2005/0198013 A1 | 9/2005 | Cunningham et al. | |

(56) References Cited

U.S. PATENT DOCUMENTS

| | | |
|---|---|---|
| 2005/0203933 A1 | 9/2005 | Chaudhuri et al. |
| 2005/0203940 A1 | 9/2005 | Farrar et al. |
| 2005/0234965 A1 | 10/2005 | Rozenshtein et al. |
| 2005/0262060 A1 | 11/2005 | Rohwedder et al. |
| 2005/0278357 A1 | 12/2005 | Brown et al. |
| 2005/0278577 A1 | 12/2005 | Doong et al. |
| 2005/0283458 A1 | 12/2005 | Galindo-Legaria et al. |
| 2005/0283471 A1 | 12/2005 | Ahmed |
| 2006/0026115 A1 | 2/2006 | Ahmed |
| 2006/0026133 A1 | 2/2006 | Ahmed |
| 2006/0031200 A1 | 2/2006 | Santosuosso |
| 2006/0036989 A1 | 2/2006 | Chaudhuri et al. |
| 2006/0041537 A1 | 2/2006 | Ahmed |
| 2006/0085378 A1 | 4/2006 | Raizman et al. |
| 2006/0085484 A1* | 4/2006 | Raizman ............ G06F 17/30336 |
| 2006/0101224 A1* | 5/2006 | Shah ..................... G06F 9/5077 711/173 |
| 2006/0107141 A1 | 5/2006 | Hekmatpour |
| 2006/0129542 A1 | 6/2006 | Hinshaw et al. |
| 2006/0195416 A1 | 8/2006 | Ewen et al. |
| 2006/0212428 A1 | 9/2006 | Nelson |
| 2006/0218123 A1 | 9/2006 | Chowdhuri et al. |
| 2007/0038618 A1 | 2/2007 | Kosciusko et al. |
| 2007/0061379 A1 | 3/2007 | Wong et al. |
| 2007/0078825 A1 | 4/2007 | Bornhoevd et al. |
| 2007/0083500 A1 | 4/2007 | Zibitsker |
| 2007/0136383 A1* | 6/2007 | Steinbach ......... G06F 17/30306 |
| 2007/0174335 A1* | 7/2007 | Konig ............... G06F 17/30306 |
| 2007/0214104 A1 | 9/2007 | Miao et al. |
| 2008/0010240 A1 | 1/2008 | Zait |
| 2008/0040196 A1 | 2/2008 | Coon et al. |
| 2008/0052271 A1* | 2/2008 | Lam .................. G06F 17/30306 |
| 2008/0071785 A1* | 3/2008 | Kabra ............... G06F 17/30306 |
| 2008/0077348 A1 | 3/2008 | Hildebrand et al. |
| 2008/0098003 A1 | 4/2008 | Dias et al. |
| 2008/0114718 A1 | 5/2008 | Anderson et al. |
| 2008/0126393 A1* | 5/2008 | Bossman .......... G06F 17/30442 |
| 2008/0133454 A1* | 6/2008 | Markl ............... G06F 17/30457 |
| 2008/0168058 A1 | 7/2008 | Gordon |
| 2008/0178079 A1* | 7/2008 | Chen ................. G06F 17/30442 715/700 |
| 2008/0208822 A1* | 8/2008 | Bozkaya ............ G06F 17/3066 |
| 2008/0215536 A1 | 9/2008 | Day et al. |
| 2008/0228710 A1 | 9/2008 | Muras |
| 2008/0235183 A1 | 9/2008 | Draese et al. |
| 2009/0006445 A1 | 1/2009 | Shemenzon et al. |
| 2009/0018992 A1 | 1/2009 | Zuzarte et al. |
| 2009/0030874 A1* | 1/2009 | Das ................... G06F 17/30312 |
| 2009/0037923 A1 | 2/2009 | Smith et al. |
| 2009/0077017 A1 | 3/2009 | Belknap et al. |
| 2009/0100004 A1* | 4/2009 | Andrei .............. G06F 17/30424 |
| 2009/0210360 A1* | 8/2009 | Sankar ................ G06F 9/44505 706/10 |
| 2009/0327214 A1 | 12/2009 | Richardson et al. |
| 2009/0327254 A1 | 12/2009 | Bruno et al. |
| 2010/0005340 A1 | 1/2010 | Belknap et al. |

OTHER PUBLICATIONS

Dias et al., "Automatic Performance Diagnosis and Tuning in Oracle", in Proceedings of the 2005 CIDR Conference, 11 pages, 2005.*

U.S. Appl. No. 12/188,975, filed Aug. 8, 2008, Advisory Action, Feb. 6, 2014.

U.S. Appl. No. 12/1888,975, filed Aug. 8, 2008, Final Office Action, May 9, 2011.

U.S. Appl. No. 12/188,975, filed Aug. 8, 2008, FInal Office Action, Oct. 17, 2013.

U.S. Appl. No. 12/188,975, filed Aug. 8, 2008, Notice of Allowance, Jul. 24, 2014.

U.S. Appl. No. 12/188,975, filed Aug. 8, 2008, Office Action, Dec. 21, 2011.

U.S. Appl. No. 12/188,975, filed Aug. 8, 2008, Office Action, Nov. 29, 2010.

U.S. Appl. No. 12/188,975, filed Aug. 8, 2008, Final Office action, Dec. 24, 2013.

U.S. Appl. No. 12/188,975, filed Aug. 8, 2008, Final Office Action, May 14, 2012.

U.S. Appl. No. 12/188,975, filed Aug. 8, 2008, Office Action, May 17, 2013.

U.S. Appl. No. 12/188,673, filed Aug. 8, 2008, Final Office Action, Dec. 22, 2011.

U.S. Appl. No. 12/188,975, filed Aug. 8, 2008, Interview Summary mailed, Dec. 17, 2013.

Chaudhuri, Surajit, An Overview of Query Optimization in Relational Systems, Microsoft Research, 1998, 10 pages.

Agrawal et al., "Automated Selection of Materialized Views and Indexex for SQL Databases", In Proceedings of the 26th International Conference on the Very Large Databases, dated 2000, 10 pages.

Englert, Susan et al., A Benchmark of NonStop SQL Release 2 Demonstrating Near-Linear Speedup and Scaleup on Large Databases,Tandem Part No. 27469, May 1989, 32 pages.

Dewitt, et al., "A Performance Analysis of the Gamma Database Machine," Computer Sciences Department, University of Wisconsin, 1988, 33 pages.

Deutsch, Alin et al., Minimization and Group-By Detection for Nested Xqueries,University of California, San Diego, 2003, 15 pages.

Dehaan, David, "A Rewriting Algorithm for Multi-Block Aggregation Queries and Views using Prerequisites and Compensations", Technical Report CS-2004-25, May 3, 2004, 39 pages.

Dayal, Umeshwar,Of Nests and Trees: A Unified Approach to Processing Queries That Contain Nested Subqueries, Aggregates and Quantifiers, Brighton 1987, pp. 197-208.

Galindo-Legaria, Cesar et al., Outerjoin Simplification and Reordering for Query Optimization, ACM Transactions on Database Systems, vol. 22, No. 1, Mar. 1997, pp. 43-74.

Copeland, George et al., "Data Placement in Bubba," ACM 0897912683, 1988, pp. 99-108.

Gopalkrishnand, Vivikanand, et al., "Issues of Object-Relational View Design in Data Warehousing Environment", IEEE 1998, 0780347781, pp. 2732-2737.

Chaudhuri, Surajit et al., Including Group-By in Query Optimization, Proceedings of the 20th VLDB Conference, 1994, pp. 354-366.

Borla-Salamet, Pascale, Compiling Control into Database Queries for Parallel Execution Management, IEEE Conference on Parallel Distributed Information Systems, 1991, pp. 271-279.

Bhide, Anupam, "An Analysis of Three Transaction Processing Architectures", Computer Science Division, UC Berkeley, Proceeding of the 14th VLDB Conference,1998, pp. 339-350.

Bergsten, et al., Prototyping DBS3 a Shared-Memory Parallel Database System, IEEE 818622954, 226-234, 1991, pp. 226-234.

Bello, Randall G. et al. Materialized Views in Oracle, VLDB '98, Proceedings of 24th International Conference, dated Aug. 24-27, 1998, New York City, New York, USA, pp. 659-664.

Arawal et al., "Database Tuning Advisor for Microsoft SQL Server 2005: Demo", In Proceedings of the 2005 ACM SIGMOD International Conference on Management of Data, dated 2005, 3 pages.

Ahmed, Rafi, et al., "Cost-Based Query Transformation in Oracle", Copyright 2006 VLDB, ACM 1595933859, pp. 1026-1036.

Dageville et al., "Automatic SQL Tuning in Oracle 10g", In Proceedings of the Thirteenth International Conference on Very Large Databases, vol. 30, dated 2004, 12 pages.

Mishra, Priti et al., Join Processing in Relational Databases, ACM Computing Surveys, vol. 24, No. 1, Mar. 1992, pp. 63-113.

Stonebraker, Michael, et al. "The Design of XPRS," Proceedings of the 14th VLDB Conference, 1988, 18 pages.

Seshadri, Preveen, Cost-Based Optimization for Magic: Algebra and Implementation, SIGMOND '96, 1996 ACM 0-89791-794-4, pp. 435-446.

Selinger, P. Griffiths, et al., Access Path Selection in a Relational Database Management System, ACM SIGMOND International Conference on the Management of Data, 1979, pp. 23-34.

(56) References Cited

OTHER PUBLICATIONS

Pirahesh, Hamid, et al., Extensible/Rule Base Query Rewrite Optimization in Starburst, IBM Almaden Research Center, ACM, SIGMOND, dated 1992, 10 pages.

Oracle® Database Performance Tuning Guide 10g Release 2 (10.2) Using Plan Stability, pp. 18-1 to 18-10, 10gR2 released Jul. 11, 2005.

Najjar, Faiza et al. "Cardinality estimation of distributed join queries", dated Sep. 1-3, 1999; Proceedings of theTenth International Workshop, pp. 66-70.

Erickson, Gail et al., "Improving Performance with SQL Server 2000 Indexed Views," Microsoft TechNet, Sep. 2000, Nov. 11, 2006, 10 pages.

Moro, Gianluca et al. "Incremental maintenance of multi-source views", Database Conference, 2001, ADC 2001, Proceedings, 12th Australasian, Jan. 2001, pp. 13-20.

Tandem, "A Benchmark of NonStop SQL on the Debit Credit Transaction", The Tandem Performance Group, 1988, 26 pages.

Lumpkin, George et al., Query Optimization in Oracle 9i, Oracle Corporation, Oracle White Paper, Feb. 2002, pp. 1-30.

Leverenz et al., Oracle 8i Concepts Release 8.1.5-A67781-01, Oracle Corporation, Feb. 1999, <http://www.csee.umbc.edu/help/oracle8/server.815/a67781/toc.htm>, 122 pages.

Kung, Chenho, "Object Subclass Hierarchy in SQL: A Simple Approach", Communications of the AC, Jul. 1990, vol. 33, No. 7, pp. 117-125.

Hong, et al., Optimization of Parallel Query Execution Plans in XPRS, IEEE, 1991, 8 pages.

Hirano, et al., Load Balancing Algorithm for Parallel Processing on Shared Memory Multiprocessor, IEEE, pp. 210-217, 1991.

Hayu, John, Analytic SQL Features in Oracle9i, An Oracle Technical White Paper, Dec. 2001, 32 pages.

Graefe, Goetz, "Encapsulation of Parallelism in the Volcano Query Processing System," Mar. 1990, 14 pages.

Muralikrishna, M., Improved Unnesting Algorithms for Join Aggregate SQL Queries, VLDB Conference, Canada, 1992, 12 pages.

* cited by examiner

FULLY AUTOMATED SQL TUNING

BENEFIT CLAIM

This application claims the benefit under 35 USC §120 as a continuation of U.S. patent application Ser. No. 12/188,975 (U.S. Pat. No. 8,903,801), filed Aug. 8, 2008, which claims the benefit under 35 U.S.C. §119(e) of U.S. Provisional Application 60/972,681, filed Sep. 14, 2007, the entire contents of each of the above listed applications are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The present invention relates to the field of electronic database management.

BACKGROUND

SQL performance is a very critical component of the overall performance of a database system. Although database applications are tested and verified before delivery to customers, the performance of SQL statements in the database applications is difficult to predict. Every time an SQL statement is executed, a different execution plan may be generated by the query optimizer. Often, the execution plan is one that has not been tested before and one whose performance has not been analyzed and verified. Should the query optimizer choose a plan that does not give the best performance, the performance of the system as a whole may suffer.

SQL tuning is a process where the performance of certain SQL statements is analyzed and changes are implemented in an effort to improve the performance of the SQL statements. However, SQL tuning is complex and time-consuming, requiring expertise in query optimization, access design, and SQL design. Often, this difficult task is performed manually by the database administrator (DBA), who must also re-tune SQL statements as the workload set on the database system and the database system itself change over time.

An SQL Tuning Advisor, as described in "AUTOMATIC SQL TUNING ADVISOR", application Ser. No. 10/936,778, filed Sep. 7, 2004, the entire contents of which is hereby incorporated by reference as if fully set forth herein, provides the DBA with the functionality of tuning SQL statements by generating tuning recommendations for the SQL statements. The SQL Tuning Advisor can, for example, perform access path analysis and recommend creating new indexes, perform statement structure analysis and recommend better written statements, and perform data statistics analysis and recommend replacing missing or stale data statistics with updated statistics.

However, using the SQL Tuning Advisor still requires significant time, effort, and involvement from DBAs. In order to use the SQL Tuning Advisor, DBAs are required to find SQL statements that are exhibiting poor performance as candidates for tuning, feed the candidate SQL statements into the SQL Tuning Advisor, and manually evaluate the results and tuning recommendations generated by the SQL Tuning Advisor to decide which tuning recommendations to implement. The SQL tuning process implemented by the SQL Tuning Advisor is itself time-consuming and, on a busy system, may need to be scheduled by the DBA. Furthermore after deciding which tuning recommendations to implements, DBAs must also monitor the performance of the database system after implementation of the tuning recommendations to check that performance gains have been achieved according to expectations. If the performance has instead deteriorated, DBAs must then perform further analysis to respond to the problem. To prepare for such a situation, DBAs also need to keep a record of prior tuning actions. Finally, this tuning process must be repeated periodically because both workload sets and database systems may change over time.

Thus, there is a need for a fully automated process for tuning SQL statements that require minimal time and effort from database administrators.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Although the embodiments of the invention are described using the term "SQL", the invention is not limited to just this particular database query language, and may be used in conjunction with other database query languages and constructs.

A process performs the following steps to provide users of database systems with a fully-automated process for tuning database query language (e.g., SQL) statements:
  (1) identify SQL statements that may adversely impact the performance of the database system;
  (2) tune the identified SQL statements to generate tuning recommendations for the SQL statements;
  (3) test the recommendations and gather data about the performance of the SQL statements with the tuning recommendations incorporated;
  (4) implement the tuning recommendations that meet certain performance improvement and/or confidence criteria; and
  (5) monitor the database system after implementation of the tuning recommendations to measure the performance of SQL statements for which tuning recommendations have been implemented.

Additionally, the fully-automated tuning process runs in a controlled environment so that the resource-intensive tuning steps in the process do not impact other activities on the database system.

Finally, the fully-automated tuning process generates detailed reports that describe how the SQL statements are tuned and which tuning recommendations were implemented and that can be provided to DBAs.

Identifying SQL Statements for Tuning

Figure 1:
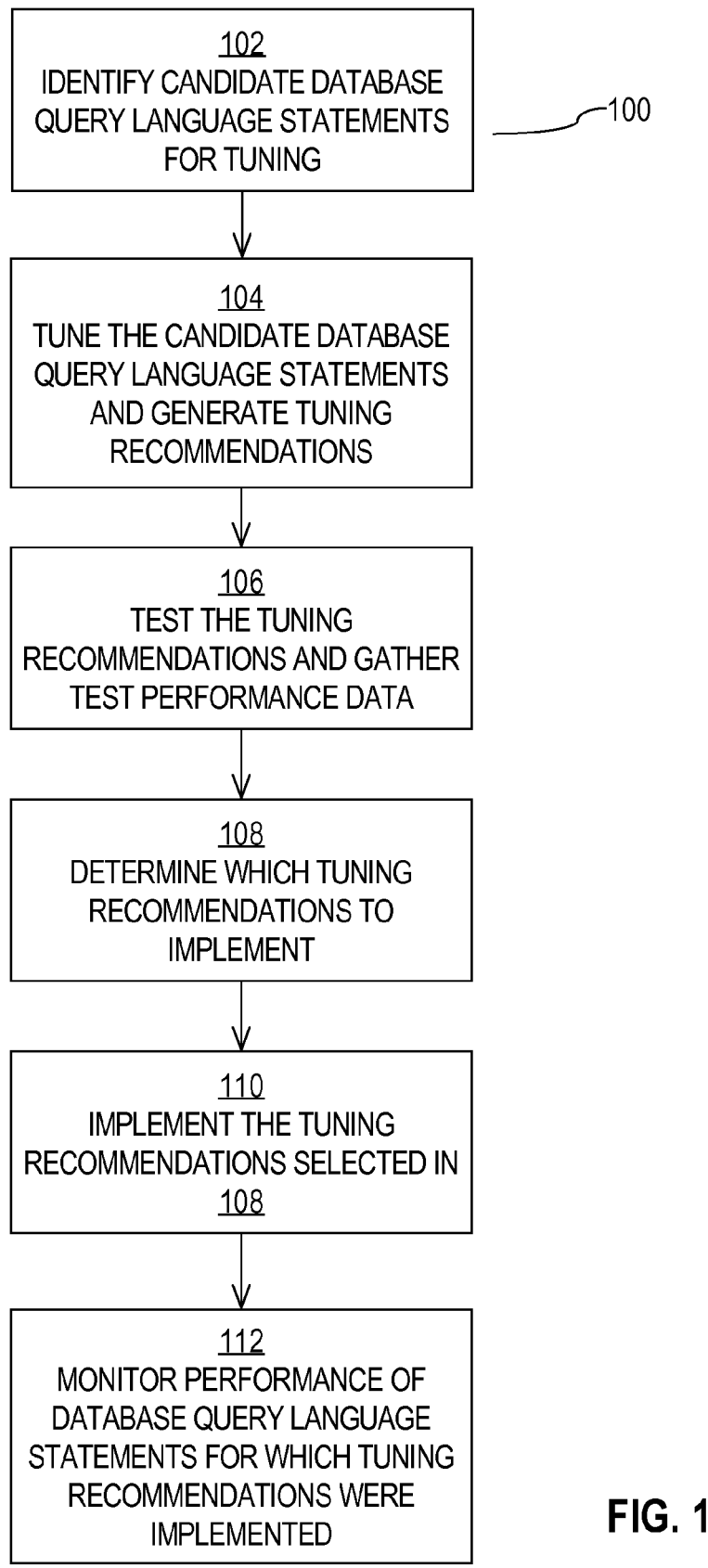
FIG. 1 is a flow diagram that illustrates steps in a fully-automatic process for tuning database query language statements.

In the fully-automated tuning process, candidate SQL statements for tuning are automatically identified. The candidate SQL statements identified for tuning are SQL statements that have been determined to impact the performance of the database system the most and for which the SQL Tuning Advisor's built-in algorithms are the most likely to help. The identification of candidate SQL statements for tuning is performed in step 102 of flow diagram 100 in FIG. 1.

In step 102, SQL statements are identified from a workload set, which is a collection of SQL statements and performance information associated with the SQL statements. According to one embodiment, the workload set is stored as a SQL Tuning Set. SQL Tuning Sets are described in "SQL TUNING SETS", application Ser. No. 10/936,449, filed on Sep. 7, 2004, the entire contents of which are hereby incorporated by reference. An SQL Tuning Set is a persistent database object that stores one or more database query language statements and performance information for each statement. The performance information may include, for example, execution measurements and execution context of each statement.

The SQL statements and associated performance information may come from a source such as an Automatic Workload Repository (AWR), which stores the statements executed during a specific period of time and the performance information associated with the executed statements. Automatic Workload Repositories (AWRs) are described in further detail in "AUTOMATIC WORKLOAD REPOSITORY BATTERY OF PERFORMANCE STATISTICS", application Ser. No. 10/934,344, filed on Sep. 3, 2004, the entire contents of which are hereby incorporated. According to one embodiment, the AWR collects and stores SQL statements and associated performance information from the past week and at an interval of one hour. The SQL statements collected by the AWR may include bind values and other critical components of the SQL's compilation environment, such as optimizer parameter values. The performance information associated with the SQL statements and collected by the AWR may include: total time spent in execution, CPU time, I/O time, the number of I/Os, and the frequency of execution.

The data collected by the Automatic Workload Repository (AWR) is analyzed in step 102 to determine which SQL statements fall within the following four categories:

(1) SQL statements that are high-load over the past week;
(2) SQL statements that are high-load over any day in the past week;
(3) SQL statements that are high-load over any hour in the past week; and
(4) SQL statements that have a high response time.

The first category of SQL statements includes SQL statements that are high-load over the past week. These are SQL statements that have the highest cumulative values of execution statistics, where each statistic represents a total amount of resources consumed over multiple executions of the SQL statement. Since one goal of performance tuning is to decrease the total amount of time spent in executing a workload set, the execution times of the SQL statements are key performance metrics. The cumulative combination of execution time and frequency of execution serves as a good proxy for measuring how significant an SQL statement is in a workload set. An SQL statement whose execution time (e.g., one-tenth of a second) is small may nonetheless constitute a large part of a workload set if the statement is executed very frequently relative to other statements (e.g., one million times a week) over the course of the past week. Thus, tuning the SQL statements that have high combinations of execution times and frequencies of execution will likely improve the overall performance of the database system.

The second category of SQL statements includes SQL statements that are highload over any day in the past week. As just discussed, high-load statements are statements that have long execution times and that are frequently executed. The first category includes statements that are high-load over the course of a past week. However, statements that are not high-load over the entire course of the past week may nonetheless significantly affect the performance of the database system. For example, a particular SQL statement may be executed only on Mondays. On Mondays, however, this particular SQL statement may be executed very frequently and may have long execution times every time it is executed. Thus, while this particular statement may not be one of the highest load statements over the course of an entire week, this particular statement may nonetheless significantly impact the performance of the database system on Mondays. The second category of high-load SQL statements captures statements like this particular statement for tuning.

The third category includes SQL statements that are high-load over any hour in the past week. The first and second categories just discussed capture SQL statements that are high-load over the course of the past week or high-load over the course of a day in the past week, but do not capture SQL statements that are high-load over an hour in the past week. For example, a particular SQL statement may be executed on only Tuesdays, and only from ten o'clock in the morning to eleven o'clock in the morning. This SQL statement is thus unlikely to be included in the first two categories. Nonetheless, if this particular SQL statement has a long execution time and is frequently executed during the one-hour interval between ten o'clock and eleven o'clock on Tuesday, it may significantly impact the performance of the database system during that one-hour interval. Therefore, tuning this particular SQL statement may significantly improve the overall performance of the database system during key time periods. These types of SQL statements are included in the third category.

The fourth category includes SQL statements which have long execution times regardless of their frequencies of execution. An SQL statement that is not frequently executed, and thus may not be included in the first three categories, may nonetheless negatively impact the response time one user experiences if it takes a very long time to execute (e.g., thirty minutes). Therefore, tuning statements like this may significantly improve overall performance. According to one embodiment, only SQL statements that have been executed at least two times over the course of the past week are included in the fourth category of SQL statements. Limiting the inclusion of SQL statements to only those statements that have been executed at least twice ensures that no tuning resources are expended on the occasional SQL statement that has been executed only once over the course of an entire week. If an SQL statement is unlikely to be executed again, tuning the SQL statement will not be an efficient use of limited system resources.

SQL tuning is a resource-intensive process, and it is likely that not all the SQL statements identified and included in the four categories described above may be tuned within the limited amount of time and resources allotted to SQL tuning. Therefore, the SQL statements identified in the four categories may be further ranked and prioritized according to their relative importance so that during the tuning process, the SQL statements with the highest priorities are executed first.

According to one embodiment, SQL statements within a single category may be ordered by performance metrics that are being optimized by the tuning process. The performance metrics being optimized may be based on the most repeatable execution statistics. For example, CPU time and buffer gets are known to repeat very reliably over multiple executions, so the SQL statements in a single category may be ordered according to a combination of CPU time and buffer get statistics.

According to another embodiment, SQL statements are tuned in an order that interweaves statements from each of the four categories. Interweaving SQL statements from each of the four categories prevents a scenario where statements from certain categories are always tuned while statements from other categories are never tuned. Interweaving may be performed by assigning different weights to different categories. A higher weight may be assigned to a category that contains SQL statements over a larger span of time. For example, an interweaving scheme may tune three statements from the first category, two statements from each of the second and third categories, and one statement from the fourth category, before returning to the first category to select further statements for tuning.

According to another embodiment, a history of SQL statements that have been tuned recently is kept. This history contains information about which SQL statements have been tuned during a specific period of time, such as the preceding week or the preceding month. An SQL statement that has been tuned recently (i.e., the SQL statement is contained in the history) is automatically not identified for tuning because it is unlikely that an SQL statement that has already been tuned recently will benefit from further tuning. However, an SQL statement that has been tuned recently may nonetheless be identified for tuning if the SQL statement meets another criterion. For example, if the SQL statement's execution statistics indicate that the SQL statement's performance has deteriorated since the last time that the SQL statement has been tuned, then this indicates that conditions in the database system that affect the SQL statement may have changed since the last time that the SQL statement was tuned, and that retuning of the SQL statement may be beneficial.

Tuning Identified SQL Statements

Once the SQL statements have been identified, they are tuned in order of priority. The tuning of candidate SQL statements is performed in step 104 in FIG. 1. According to one embodiment, the fully automated tuning process feeds the SQL statements, one-by-one and in order of priority, to the SQL Tuning Advisor, which then generates a set of tuning recommendations for each SQL statement.

According to one embodiment, the SQL Tuning Advisor uses the database system's query optimizer that is set to operate in tuning mode. Normally, the query optimizer of a database system compiles SQL statements and generates execution plans. In normal mode, the query optimizer operates with very strict time constraints, usually a fraction of a second, during which time it must find a good execution plan for an SQL statement. In tuning mode, however, the optimizer is under much less stringent time constraints, and can perform longer and more thorough analyses to determine whether the execution plan produced for an SQL statement in the normal mode can be further improved. The output of the query optimizer in tuning mode is not execution plans, but a set of estimates to better inform the cost-based optimizer with the information it requires for producing superior execution plans.

During tuning, the SQL Tuning Advisor performs four types of analyses: (1) statistics analysis; (2) SQL profiling; (3) access path analysis; and (4) SQL structure analysis.

In normal mode, the query optimizer relies on object statistics to generate execution plans. If the statistics are stale or missing, the execution plans that are generated may be poor. During tuning, the SQL Tuning Advisor checks the object statistics and generates recommendations to gather relevant statistics for objects with stale or missing statistics. The identification of inaccurate statistics for an SQL statement is described in further detail in "HIGH LOAD SQL DRIVEN STATISTICS COLLECTION", application Ser. No. 10/936,427, filed Sep. 7, 2004, the entire contents of which are incorporated by reference herein.

In addition, the SQL Tuning Advisor also produces auxiliary information that includes statistics for objects with no statistics and statistic adjustment factors for different estimates made by the query optimizer. The auxiliary information may be collected by gathering additional information using sampling and partial execution techniques. According to one embodiment, this auxiliary information is stored in an object called an SQL Profile. Each SQL Profile is specific to and associated with a single SQL statement. SQL Profiles are described in further detail in "SQL PROFILE", application Ser. No. 10/936,205, filed Sep. 7, 2004, the entire contents of which are incorporated by reference herein.

SQL Profiles store statistic adjustment factors that are not themselves statistics but that adjust the pre-existing statistics and/or estimates of statistics of database objects. For example, a cardinality estimate for a particular query predicate in a particular SQL statement may be 10%, while the actual cardinality for that particular query predicate is 30%. The SQL Profile for the particular SQL statement may then contain a cardinality adjustment factor of 3 for the particular query predicate, so that a query optimizer that is generating an execution plan for the particular SQL statement may consult the SQL Profile to multiply any preexisting cardinality estimates for the particular predicate in the particular SQL statement by 3. As such, execution plans that are generated based on SQL Profiles will be based on more accurate statistical estimates and will therefore be more optimized.

According to one embodiment, the SQL Advisor generates tuning recommendations that recommend the acceptance of SQL Profiles. Once an SQL Profile for a particular SQL statement is accepted, the SQL Profile is stored persistently in a data dictionary that associates the SQL Profile with the particular SQL statement. After the SQL Profile is stored persistently, the next time that the particular SQL statement is analyzed by the query optimizer operating in normal mode, the execution plan for the particular SQL statement will be generated based on statistics that are adjusted by the adjustment factors stored in the SQL Profile that is associated with the particular SQL statement.

One advantage of using SQL Profiles is that, unlike stored outlines, an SQL Profile does not freeze the execution plan of an SQL statement. Because an SQL Profile contains adjustment factors for statistics, these adjustment factors continue to be relevant even when objects such as tables and indexes grow, shrink, are created or are deleted, and even when the data distribution or access path of the associated SQL statement changes. Therefore, an SQL Profile need not be regenerated frequently. After a long period of time, however, an SQL Profile may become outdated. At such times, a new SQL Profile may be generated for the associated SQL statement by running the SQL Tuning Advisor again on the associated SQL statement.

The SQL Tuning Advisor may also perform access path analysis. During access path analysis, the SQL Tuning Advisor explores whether a new index can significantly enhance the performance of an SQL statement. If such an index is identified, a tuning recommendation is generated to recommend the creation of the index.

Finally, the SQL Tuning Advisor performs SQL structure analysis. During SQL structure analysis, the SQL Tuning Advisor identifies common problems with the structure of SQL statements that can lead to poor performance, including syntactic, semantic, or design problems. Further details on SQL structure analysis are described in "SQL STRUCTURE ANALYZER", application Ser. No. 10/936,426, filed Sep. 7, 2004, the entire contents of which is hereby incorporated by reference as if fully set forth herein. Relevant suggestions for restructuring SQL statements are generated as tuning recommendations.

Testing the Tuning Recommendations

In order to determine how the tuning recommendations generated by the SQL Tuning Advisor will affect the performance of SQL statements and to determine whether to implement the tuning recommendations on the database system, the tuning recommendations are tested in a test environment. According to one embodiment, testing and execution services such as the ones described in "TEST EXECUTION OF USER SQL IN DATABASE SERVER CODE", application Ser. No. 12/217,249, filed on Jul. 2, 2008, the entire contents of which is hereby incorporated by reference as if fully set forth herein, are used to perform testing of the tuning recommendations.

In the test environment, the SQL statements are executed with the tuning recommendations enabled, and execution statistics such as execution time are gathered. This is performed in step 106 in FIG. 1. To use the allocated testing time most efficiently, the query plans are executed in rounds with time limits that increase until at least one plan finishes and a decision can be made about which execution plan is best (i.e. consumes the least amount of system resources). Once this decision is made, the system will terminate the execution of the plan shown to be worse; this way, time will not be wasted executing a query plan which might take a very long time to complete when another plan has been shown to complete in much less time. Further details regarding the testing of alternative execution plans are described in "TEST EXECUTION OF USER SQL IN DATABASE SERVER CODE", application Ser. No. 12/217,249, filed on Jul. 2, 2008.

Choosing Tuning Recommendations to Implement

One goal of the step of selecting which tuning recommendations to implement is to choose the subset of the tuning recommendations generated from the tuning step that would improve performance the most without implementing too much change in the database system. According to one embodiment, the results from the testing step just described are analyzed, and only the tuning recommendations that result in substantial benefits are implemented. Furthermore, in order to limit the number of changes made to the database system on a daily basis, a limit on the number of actions taken during maintenance may also be configured so that tuning recommendations are implemented only if the number of changes made does not already exceed the preconfigured limit. As described above, SQL statements which have been identified as good candidates for tuning are tuned in order of priority. Therefore, the tuning recommendations for the highest-priority SQL statements would be implemented first and will unlikely be precluded from implementation by the cap on number of changes. The determination of which tuning recommendations are to be implemented is made in step 108 of FIG. 1.

According to one embodiment, only tuning recommendations that have resulted in performance improvement that meet a specific set of criteria are implemented. In one example, only tuning recommendations that improve the execution time by at least threefold are implemented. The threefold improvement is measured in terms of specific execution statistics which are known to have consistent values across multiple executions. CPU time and buffer gets (logical I/Os) are two metrics that may be used to measure improvement because CPU time and buffer gets are both repeatable measurements that encompass important factors in SQL performance.

According to another embodiment, only tuning recommendations that meet a specific set of safety criteria are implemented. For example, in one example, only tuning recommendations that do not increase the I/O times of SQL statements are implemented, even if the tuning recommendations decrease the overall execution times of the SQL statements.

In step 110, the tuning recommendations that have been determined to be implemented are implemented. For SQL Profiles, for example, this means that the SQL Profiles are stored persistently in a data dictionary that associates the SQL Profiles with specific SQL statements. As discussed above, once a particular SQL Profile is stored persistently, the next time that the particular SQL statement is analyzed by the query optimizer operating in normal mode, the execution plan for the particular SQL statement will be generated based on statistics that are adjusted by the adjustment factors stored in the SQL Profile that is associated with the particular SQL statement.

Running the Fully-Automated Tuning Process in a Controlled Environment

The automatic tuning of SQL statements is a resource-intensive and time consuming process. The tuning process is run in a controlled environment so that other activities on the machine on which the tuning process is run are not interrupted. Furthermore, in the controlled environment, the tuning process may be restricted to run only for a specified period of time.

According to one embodiment, the automatic tuning process is run in an automated maintenance task that is run on a nightly basis. The frequency, begin time, and end time that the automatic tuning process is run may be customized by the DBA.

Within the specified period of time (e.g., one hour), the tuning process performs the steps of: identifying candidate SQL statements from the AWR for tuning; tuning each SQL statement individually be calling the SQL Tuning Advisor; testing the SQL profiles generated by SQL Tuning Advisor; and optionally implementing the SQL profiles if they meet the criteria (e.g., three-fold performance improvement).

According to one embodiment, the fully-automated tuning process described above is performed by an automated maintenance task. The automated maintenance task caps the resources used by the tuning process to a specific percentage of the total resource consumption on the machine on which the tuning process is being made. The automated maintenance task also caps the total amount of time for the tuning process so that the tuning process does not run for an inordinately long period of time. Finally, the amount of time the tuning process spends tuning each individual SQL statement may be capped by the tuning process itself to prevent the tuning process from spending too much time analyzing one particular SQL statement. In addition, the total amount of time the tuning process spends tuning all the selected SQL statements may also be capped by the tuning process itself. For example, the automated maintenance task may cap the total amount of time spent by the tuning process to four hours, while the tuning process may cap the own total tuning time to one hour and cap the tuning time for a single SQL statement to twenty minutes. According to one embodiment, when any of these time limits is reached, the tuning process may be notified and in response may complete the current tuning activity in such a manner that ensures that the partial results will be consumable by the user at a later time.

According to one embodiment, a separate and independent mechanism monitors the total amount of time that the tuning process has used. If the separate and independent mechanism detects that the total amount of time used by the tuning process has exceeded the specified cap, then the tuning process is terminated.

According to another embodiment, the tuning process monitors whether or not its actions are causing any contentions with other sessions in the database system. When the tuning process detects such a contention, it will stop tuning the SQL statement currently being tuned and commence tuning the SQL statement with the next highest priority. If this action does not immediately resolve the contention, the tuning process may be aborted entirely.

Monitoring the System after Implementation of Tuning Recommendations

After the tuning recommendations are implemented, the database system is monitored to detect when the tuning recommendations are used and to measure the benefits form the tuning recommendations. This is performed in step 112 of FIG. 1. According to one embodiment, if the benefit from a particular tuning recommendation is less than its anticipated benefit, the recommendation is reverted.

Reporting Results of the Tuning Process

According to one embodiment, information gathered during the tuning process is compiled into a report, which can then be reviewed by the DBA. This report may include, for example, a list of the SQL statements that were tuned, the tuning recommendations generated by the SQL Tuning Advisor, the results from testing the tuning recommendations, and a list of which tuning recommendations were implemented. The DBA may examine this report to implement additional tuning recommendations or to remove any tuning recommendations that were automatically implemented.

Hardware Overview

Figure 2:
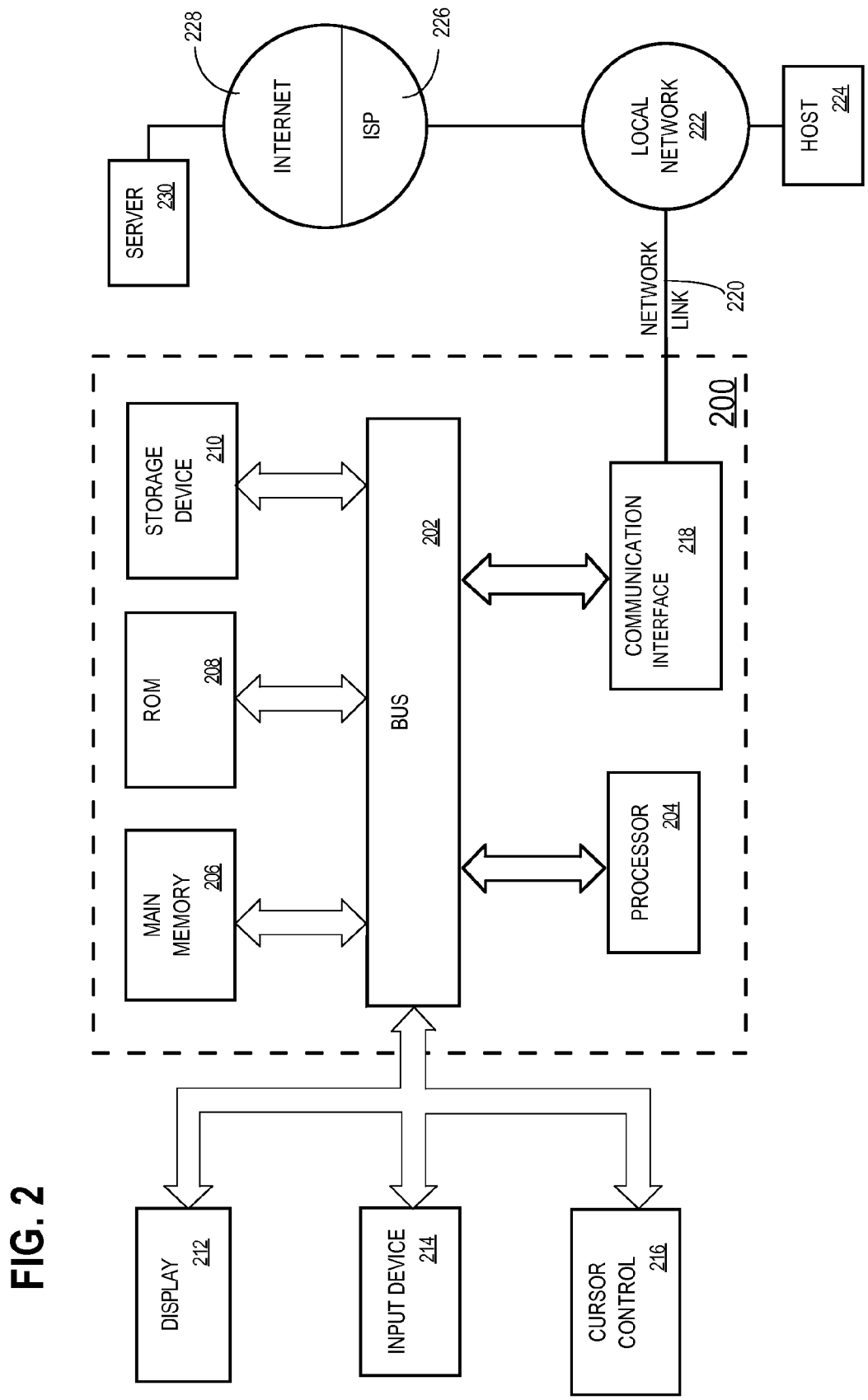
FIG. 2 is a diagram of a computer system that may be used in an implementation of an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
   from a workload set, automatically selecting a plurality of database query language statements for automatic tuning, wherein the workload set comprises multiple database query language statements and performance data for the multiple database query language statements;
   automatically tuning the plurality of database query language statements until one or more time periods are reached or exceeded, thereby generating a plurality of tuning recommendations for a subset of database query language statements of said plurality of database query language statements, each tuning recommendation of said plurality of tuning recommendations being a tuning recommendation for a database query language statement of said subset of database query language statements;
   automatically testing the plurality of tuning recommendations against a database, wherein testing the plurality of tuning recommendations comprises, for one or more tuning recommendations of said plurality of tuning recommendations, automatically executing a particular database query language statement from said subset of database query language statements with said one or more tuning recommendations enabled thereby automatically generating an execution plan for the particular database query language statement based on said one or more tuning recommendations enabled for testing and automatically testing said execution plan against one or more other alternative execution plans for the particular database query language statement generated based on enabling, for testing, one or more other tuning recommendations from the plurality of tuning recommendations;
   based at least in part on automatically testing the plurality of tuning recommendations against the database, automatically implementing at least one tuning recommendation of said plurality of tuning recommendations and not implementing at least another tuning recommendation of said plurality of tuning recommendations; and
   wherein the steps are performed by one or more computing devices.

2. The computer-implemented method of claim 1, wherein enabling said one or more tuning recommendations of the plurality of tuning recommendations against said database causes a number of database changes, wherein the number of database changes is below a maximum number of database changes.

3. The computer-implemented method of claim 1, wherein the tuning the plurality of database query language statements until the one or more time periods are reached or exceeded includes at least one of:
   tuning a single database query language statement of said plurality of database query language statements until a particular time period of said one or more time periods is reached or exceeded; or
   tuning two or more database query language statements of said plurality of database query language statements until a single time period of said one or more time periods is reached or exceeded.

4. The computer-implemented method of claim 3, wherein the single time period is tracked by an independent and separate mechanism from a mechanism performing the tuning.

5. The computer-implemented method of claim 1, wherein the testing said plurality of tuning recommendations further comprises measuring an execution time period for executing the particular database query language statement with said one or more tuning recommendations enabled.

6. The computer-implemented method of claim 5, further comprising:
if the execution time period for executing the particular database query language statement reaches or exceeds an execution time period for a completed execution of the particular database query language statement with different one or more tuning recommendations from said plurality of tuning recommendations, enabled, then aborting the executing the particular database query language statement.

7. The computer-implemented method of claim 5, wherein the execution time period is limited to a certain time period, which is extended to complete at least one execution of the particular database query language statement with a certain tuning recommendation, from said plurality of tuning recommendations, enabled.

8. The computer-implemented method of claim 1, wherein the testing further comprises measuring resource usage by said executing the particular database query language statement with said one or more tuning recommendations enabled.

9. The computer-implemented method of claim 1, wherein the testing further comprises measuring benefits based on performance improvement of said executing the particular database query language statement with said one or more tuning recommendations enabled.

10. The computer-implemented method of claim 9, further comprising, based on the testing, determining a subset of said plurality of tuning recommendations resulted in performance improvement that meets a criterion.

11. The computer-implemented method of claim 1, wherein the automatically selecting the plurality of database query language statements from the workload set is based at least on a frequency of one or more executions of each of the plurality of database query language statements.

12. The computer-implemented method of claim 1, wherein said automatically selecting the plurality of database query language statements for automatic tuning, said automatically tuning the plurality of database query language statements, and said automatically testing the plurality of tuning recommendations against the database are performed until a certain time period, of the one or more time periods, is reached.

13. The computer-implemented method of claim 12, wherein said automatically implementing the at least one tuning recommendation is also performed until the certain time period is reached.

14. The computer-implemented method of claim 1, further comprising automatically increasing a testing time period, configured to limit automatically testing one or more execution plans, until finishing automatic execution of at least one execution plan for the particular database query language statement.

15. The computer-implemented method of claim 1, further comprising automatically terminating said automatically testing said execution plan when resulting performance data for said execution plan is automatically determined to be worse than performance data of at least one of the one or more other alternative execution plans for the particular database query language statement.

16. A computer-readable non-transitory storage medium storing instructions, wherein the instructions include instructions which, when executed by one or more processors, cause the one or more processors to perform steps of:
from a workload set, automatically selecting a plurality of database query language statements for automatic tuning, wherein the workload set comprises multiple database query language statements and performance data for the multiple database query language statements;
automatically tuning the plurality of database query language statements until one or more time periods for said tuning the plurality of database query language statements are reached or exceeded, thereby generating a plurality of tuning recommendations for a subset of database query language statements of said plurality of database query language statements, each tuning recommendation of said plurality of tuning recommendations being a tuning recommendation for a database query language statement of said subset of database query language statements;
automatically testing the plurality of tuning recommendations against a database, wherein testing the plurality of tuning recommendations comprises, for one or more tuning recommendations of said plurality of tuning recommendations, automatically executing a particular database query language statement from said subset of database query language statements with said one or more tuning recommendations enabled thereby automatically generating an execution plan for the particular database query language statement based on said one or more tuning recommendations enabled for testing and automatically testing said execution plan against one or more other alternative execution plans for the particular database query language statement generated based on enabling, for testing, one or more other tuning recommendations from the plurality of tuning recommendations;
based at least in part on automatically testing the plurality of tuning recommendations against the database, automatically implementing at least one tuning recommendation of said plurality of tuning recommendations and not implementing at least another tuning recommendation of said plurality of tuning recommendations.

17. The computer-readable non-transitory storage medium of claim 16, wherein enabling said one or more tuning recommendations of the plurality of tuning recommendations against said database causes a number of database changes, wherein the number of database changes is below a maximum number of database changes.

18. The computer-readable non-transitory storage medium of claim 16, wherein the tuning the plurality of database query language statements until the one or more time periods are reached or exceeded includes at least one of:
tuning a single database query language statement of said plurality of database query language statements until a particular time period of said one or more time periods is reached or exceeded; or
tuning two or more database query language statements of said plurality of database query language statements until a single time period of said one or more time periods is reached or exceeded.

19. The computer-readable non-transitory storage medium of claim 18, wherein the single time period is tracked by an independent and separate mechanism from a mechanism performing the tuning.

20. The computer-readable non-transitory storage medium of claim 16, wherein the testing said plurality of tuning recommendations further comprises measuring an execution time period for executing the particular database query language statement with said one or more tuning recommendations enabled.

21. The computer-readable non-transitory storage medium of claim 20, the instructions further comprising instructions for:

if the execution time period for executing the particular database query language statement reaches or exceeds an execution time period for a completed execution of the particular database query language statement with different one or more tuning recommendations from said plurality of tuning recommendations, enabled, then aborting the executing the particular database query language statement.

22. The computer-readable non-transitory storage medium of claim 20, wherein the execution time period is limited to a certain time period, which is extended to complete at least one execution of the particular database query language statement with a certain tuning recommendation, from said plurality of tuning recommendations, enabled.

23. The computer-readable non-transitory storage medium of claim 16, wherein the testing further comprises measuring resource usage by said executing the particular database query language statement with said one or more tuning recommendations enabled.

24. The computer-readable non-transitory storage medium of claim 16, wherein the testing further comprises measuring benefits based on performance improvement of said executing the particular database query language statement with said one or more tuning recommendations enabled.

25. The computer-readable non-transitory storage medium of claim 24, the instructions further comprising instructions for, based on the testing, determining a subset of said plurality of tuning recommendations resulted in performance improvement that meets a criterion.

* * * * *

UNITED STATES PATENT AND TRADEMARK OFFICE
CERTIFICATE OF CORRECTION

PATENT NO. : 9,720,941 B2  Page 1 of 1
APPLICATION NO. : 14/549449
DATED : August 1, 2017
INVENTOR(S) : Belknap et al.

It is certified that error appears in the above-identified patent and that said Letters Patent is hereby corrected as shown below:

On page 3, Column 2, under Other Publications, Line 16, delete "Indexex" and insert -- Indexes --, therefor.

Signed and Sealed this
First Day of May, 2018

Andrei Iancu
*Director of the United States Patent and Trademark Office*